United States Patent [19]

Ansart et al.

[11] Patent Number: 5,592,819
[45] Date of Patent: Jan. 14, 1997

[54] PRE-MIXING INJECTION SYSTEM FOR A TURBOJET ENGINE

[75] Inventors: Denis R. H. Ansart, Bois le Roi; Patrice A. Commaret, Maincy; Etienne S. R. David, Bois le Roi; Michel A. A. Desaulty, Vert Saint Denis; Bruno M. M. Quinquenneau, Massy; Denis Sandelis, Nangis, all of France

[73] Assignee: Societe Nationale D'Etude et de Construction de Moteurs D'Aviation S.N.E.C.M.A., Paris CEdex, France

[21] Appl. No.: 400,574

[22] Filed: Mar. 8, 1995

[30] Foreign Application Priority Data

Mar. 10, 1994 [FR] France ................... 94 02750

[51] Int. Cl.$^6$ ........................ F23R 3/34
[52] U.S. Cl. ........................ 60/737; 60/755
[58] Field of Search ................ 60/737, 748, 755, 60/756, 757, 747

[56] References Cited

U.S. PATENT DOCUMENTS

| | | |
|---|---|---|
| 3,851,466 | 12/1974 | Verdouw . |
| 3,899,884 | 8/1975 | Ekstedt . |
| 3,927,958 | 12/1975 | Quinn ........................ 60/737 |
| 4,215,535 | 8/1980 | Lewis . |
| 4,726,182 | 2/1988 | Barbier et al. . |

FOREIGN PATENT DOCUMENTS

| | | |
|---|---|---|
| 0441542 | 8/1991 | European Pat. Off. . |
| 0445652 | 9/1991 | European Pat. Off. . |
| 2116363 | 7/1972 | France . |
| 2415203 | 8/1979 | France . |
| 1029195 | 4/1958 | Germany . |
| 2415036 | 11/1974 | Germany . |
| 593457 | 11/1977 | Switzerland . |

Primary Examiner—Timothy S. Thorpe
Attorney, Agent, or Firm—Bacon & Thomas

[57] ABSTRACT

A pre-mixing injection system to feed a fuel/air mixture to a combustion zone in a turbojet engine combustion chamber is disclosed having a pre-mixing tube defining a convergent pre-mixing zone and a diverging intermediate zone between the fuel and air injection devices, and the combustion zone of the combustion chamber. The convergent pre-mixing zone has an inlet adjacent to the fuel injector and air swirlers to accept the fuel/air mixture into the pre-mixing tube. The pre-mixing zone converges in a direction from the inlet to an outlet which is in communication with the inlet of the divergent intermediate zone. The divergent intermediate zone has an outlet which is, in turn, in communication with the combustion zone of the turbojet engine combustion chamber. The divergent intermediate zone is defined by an inner wall and an outer wall spaced from the inner wall so as to define a generally frusto-conical chamber between them. The outer wall has a plurality of cooling holes to enable cooling air to pass through the outer wall into cooling contact with the inner wall. The frusto-conical chamber has a downstream evacuation passage to allow cooling air to pass from the frusto-conical chamber.

11 Claims, 5 Drawing Sheets

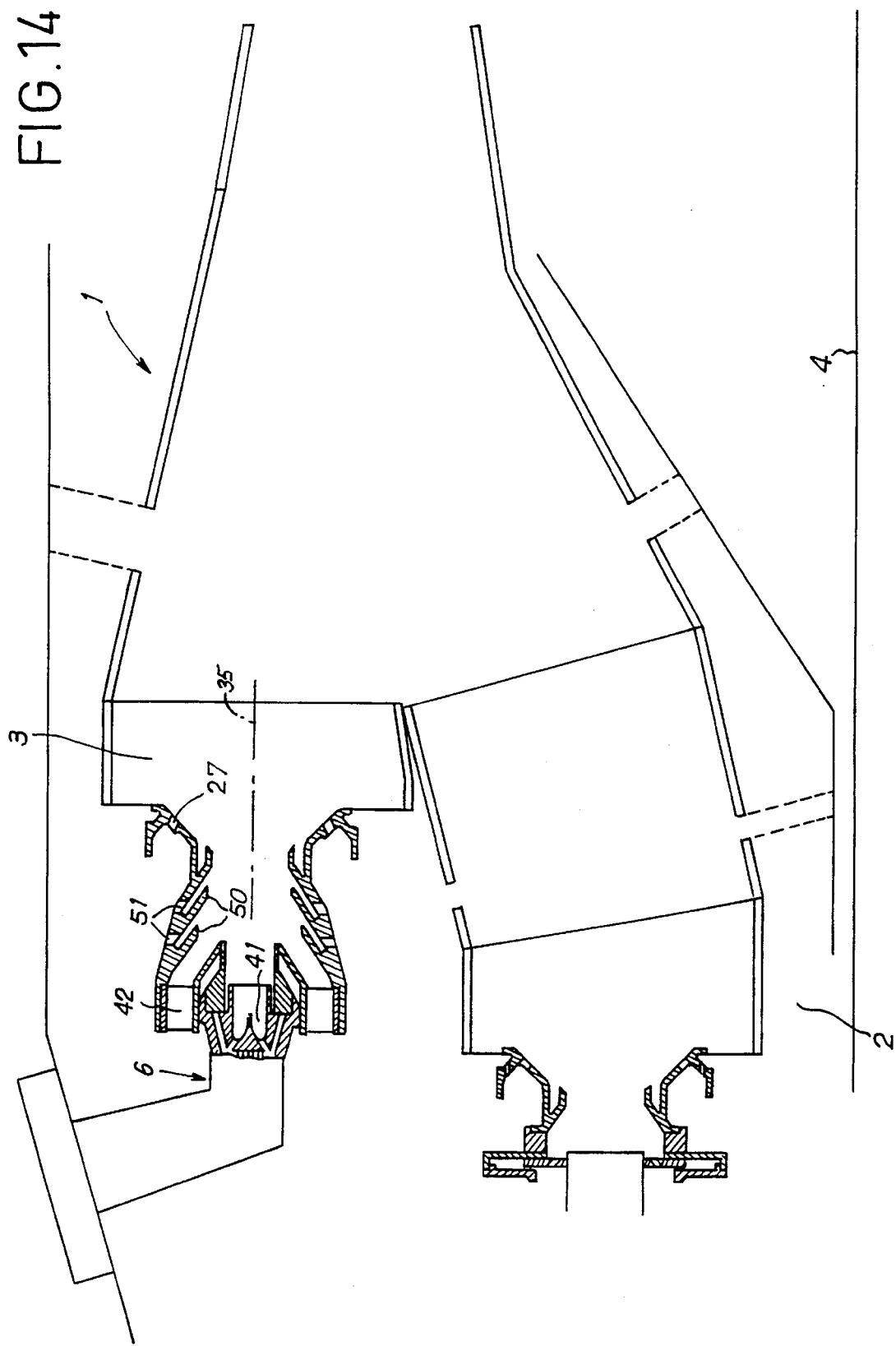

PRE-MIXING INJECTION SYSTEM FOR A TURBOJET ENGINE

BACKGROUND OF THE INVENTION

The present invention relates to pre-mixing injection system for supplying a fuel/air mixture to a combustion zone of a turbojet engine combustion chamber.

Conventional present day aircraft turbojet engines have dual annular arrays of combustion heads or modules, typically one array of combustion heads being utilized for low-power operations and the other combustion head array utilized for full-power operations, such as take offs. The combustion heads typically comprise two annular arrays, one located radially outwardly of the other relative to the center line of the combustion chamber. The combustion head array utilized for full-power or take off operations may be located radially inwardly of the other combustion head, or may be located radially outwardly of the other combustion head. Typically, in such dual array combustion head construction, the full-power or take off combustion head is fitted with a pre-mixture injection system comprising an aeromechanical fuel injector accompanied by radial or axial air swirlers located up at the upstream end of a pre-mixing tube.

In such known devices, the pre-mixing tube may assume either a converging or diverging configuration in a direction from the combustion head to the combustion zone of the combustion chamber. A converging pre-mixing tube is used to uniformly accelerate the flow of the air/fuel mixture to assure a safety margin to prevent flashback of the flame into the pre-mixing tube. With this construction, flame stabilization suffers and may be possible only adjacent to the corners of the combustion chamber end. If the pre-mixing tube assumes a diverging configuration, a central recirculation zone within the combustion zone of the combustion chamber is achieved. However, such a construction may allow the flame front to flash back into the pre-mixing tube. In regards to the converging pre-mixing tube, considering the high speeds of the mixture and the leanness of the mixture, the equivalence ratio being approximately being 0.6, the recirculating zones in the edges of the combustion chamber end and the local richness of the mixture make it difficult to achieve satisfactory combustion stability.

European Patent Application 0441 542 discloses a combustion chamber structure having a venturi tube inserted between an annular pre-mixing chamber and the combustion zone of the combustion chamber. This burner is specifically designed for natural gas or hydrocarbon vapors.

French Patent 2,116,363 also discloses the concept of using a venturi tube located between the fuel injector and the combustion zone of the combustion chamber. In this design the venturi tube encloses the conical fuel jet emerging from the fuel injector, the converging portion of the venturi tube accelerating the air around the fuel injector. The divergent portion of the venturi has a wall substantially tangential to the fuel cone. No pre-mixing upstream of the venturi tube takes place in this structure. The purpose of the venturi tube in this device is to achieve adequate mixture richness in relation to stoichiometry in the vicinity of the venturi-tube constriction to prevent combustion in the tube which is also precluded by the speed at which the fuel/air mixture flows.

SUMMARY OF THE INVENTION

A pre-mixing injection system to feed a fuel/air mixture to a combustion zone in a turbojet engine combustion chamber is disclosed having a pre-mixing tube defining a convergent pre-mixing zone and a diverging intermediate zone between the fuel and air injection devices, and the combustion zone of the combustion chamber. The convergent pre-mixing zone has an inlet adjacent to the fuel injector and air swirlers to accept the fuel/air mixture into the pre-mixing tube. The pre-mixing zone converges in a direction from the inlet to an outlet which is in communication with the inlet of the divergent intermediate zone. The divergent intermediate zone has an outlet which is, in turn, in communication with the combustion zone of the turbojet engine combustion chamber.

The divergent intermediate zone is defined by an inner wall and an outer wall spaced from the inner wall so as to define a generally frusto-conical chamber between them. The outer wall has a plurality of cooling holes to enable cooling air to pass through the outer wall into cooling contact with the inner wall. The frusto-conical chamber has a downstream evacuation passage to allow cooling air to pass from the frusto-conical chamber.

The inner wall has a plurality of openings to introduce cooling air from the frusto-conical chamber into the diverging intermediate zone. The openings may take the form of a plurality of orifices, or may take the form of a plurality of elongated slots extending obliquely to the central longitudinal axis of the intermediate zone.

An object of the present invention is to provide a pre-mixing injection system which has high flame stabilization and at the same achieves excellent mixing of the fuel and air. This is achieved by the invention by having an upstream convergent pre-mixing zone and a divergent downstream intermediate zone, and by introducing air into the intermediate zone to provide favorable turbulence conditions for the flow emanating from the pre-mixing zone during its expansion in the diverging intermediate zone. The converging portion of the pre-mixing tube may also have obliquely extending boreholes to enable cooling air to pass through the holes and form a film on the inner surface of the converging pre-mixing tube to achieve film cooling of this portion of the invention.

BRIEF DESCRIPTION OF THE DRAWINGS

FIG. 14 is a schematic, cross-sectional view of a dual combustion head combustion chamber structure fitted with a pre-mixing injection system according to the present invention.

DETAILED DESCRIPTION OF THE PREFERRED EMBODIMENTS

Figure 1:
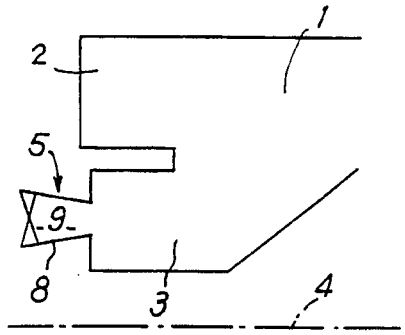
FIG. 1 is a schematic illustration of a dual head combustion chamber with the full power or take off combustion head located radially inwardly of the low power combustion head.
Figure 2:
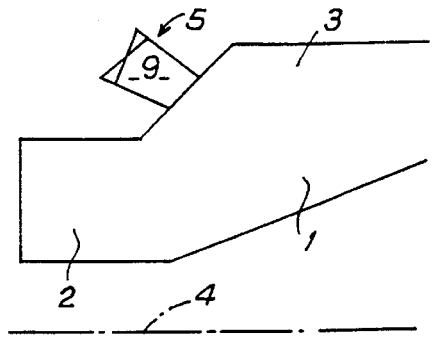
FIG. 2 is a schematic diagram similar to FIG. 1, but illustrating a dual head combustion chamber with the take off or high power head located radially outwardly of the low power combustion head.

FIGS. 1 and 2 schematically illustrate a turbojet engine having an annular combustion chamber 1 with a low-power combustion head 2 and a take off or high-power combustion head 3 which are radially displaced from each other in regard to the longitudinal axis 4 of the combustion chamber 1. In FIG. 1, the high power or take off combustion head 3 is located radially inwardly of the low power combustion head 2, while in FIG. 2, the high power combustion head 3 is located radially outwardly of the low power combustion head 2 in regard to the axis 4.

Figure 3:
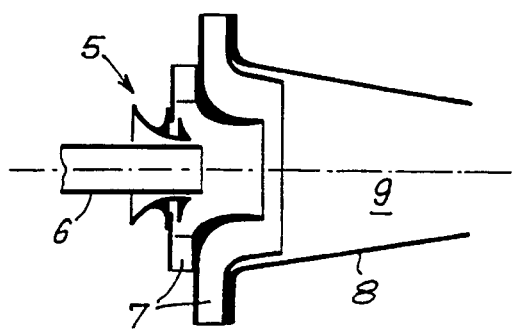
FIG. 3 is a schematic representation of a known pre-mixing system utilizing radial swirlers and an aeromechanical fuel injector.
Figure 4:
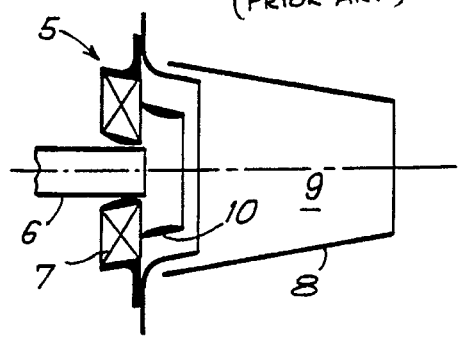
FIG. 4 is a view similar to FIG. 3, illustrating a second known pre-mixing system using axial swirlers and aeromechanical fuel injection.

The high power or take off combustion head 3 is fitted with a pre-mixing injection system 5 which comprises a fuel injector 6, at least one air swirler 7 to introduce vaporizing air into the system and which encloses the injector 6, and pre-mixing tube 8 bounding a pre-mixing chamber 9. FIGS. 3 and 4 illustrate known injection systems 5 fitted with converging pre-mixing tubes 8. The injection system shown in FIG. 3 comprises two radial swirlers 7, whereas the pre-mixing injection system 5 illustrated in FIG. 4 comprises one axial air swirler 7 in which the outlet flow is split into two flows by annular collar 10.

Figure 5:
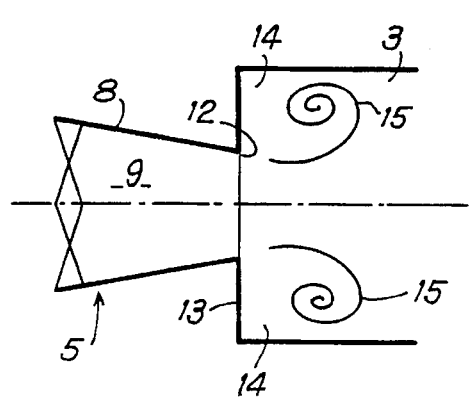
FIG. 5 is a schematic diagram illustrating the recirculation of gasses in a combustion chamber fitted with a known, convergent pre-mixing tube.
Figure 6:
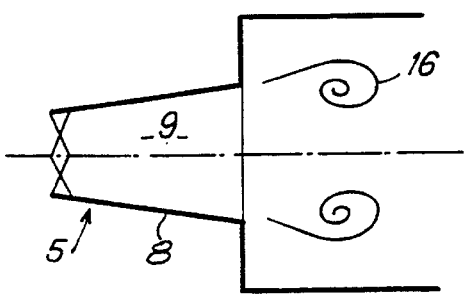
FIG. 6 is a view similar to FIG. 5 schematically illustrating the gas circulation in a combustion chamber fitted with a known diverging pre-mixing tube.

FIGS. 5 and 6 schematically illustrate the known pre-mixing injection systems 5 at an upstream end of the combustion chamber. In FIG. 5 a converging pre-mixing tube 8 is illustrated having outlet 12 extending through upstream endwall 13 at the upstream end of the combustion zone for combustion head 3. Lateral recirculations of the fuel/air mixture are denoted at 15 and are created in the corners 14 at the upstream end of the combustion zone. The fuel/air in these zones is only slightly mixed or carbureted and flame stability is, therefore, only fair with this structure. However, the structure does prevent flame flashback from the combustion chamber into the pre-mixing zone.

The divergent pre-mixing tube 8 illustrated in FIG. 6 also has its outlet communicating with the combustion zone of the take off combustion head through the upstream end wall. In this instance, the recirculation of the fuel/air mixture is denoted at 16 which generally is oriented towards the central portion of the combustion zone. These recirculation zones are strongly carbureted to enhance flame stability, but flame flashback remains possible with this structure.

Figure 7:
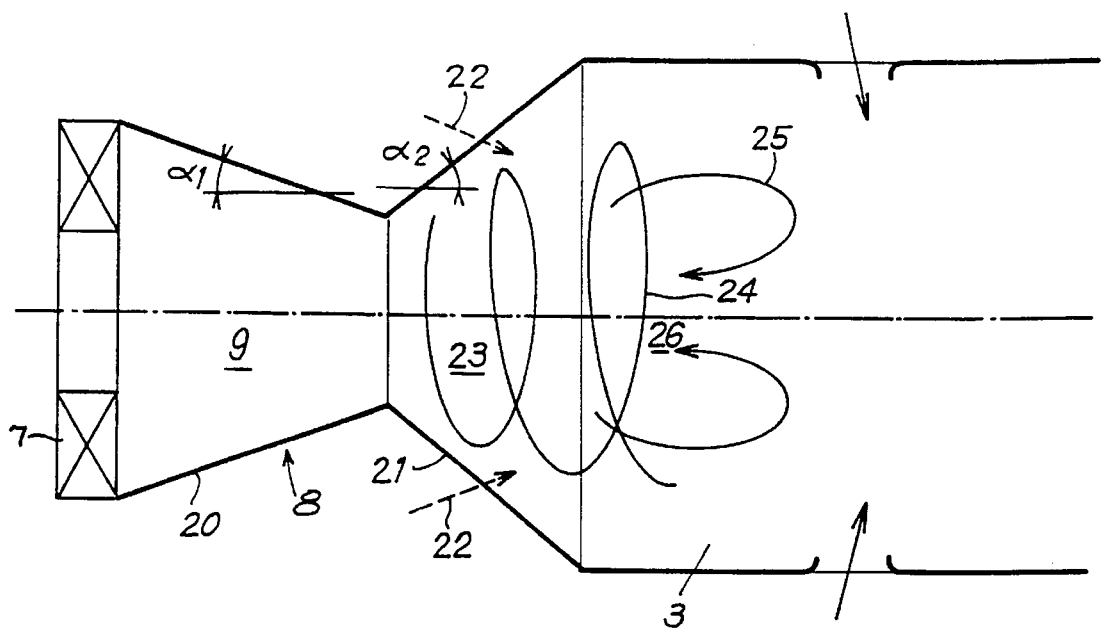
FIG. 7 is a schematic view illustrating the pre-mixing injection system according to the present invention illustrating the recirculation in the combustion zone of the combustion chamber.

FIG. 7 schematically illustrates a pre-mixing injection system according to the present invention. The pre-mixing tube 8 comprises an upstream, converging portion 20 bounding a convergent pre-mixing zone 9 and a downstream, diverging portion 21 bounding an intermediate zone 23 which communicates with the combustion zone of the combustion head 3. The converging portion 20 has an upstream inlet in communication with an aeromechanical or aerodynamic fuel injector and at least one intake swirler. The injector 6 and the swirler 7 may assume the known designs as illustrated in FIGS. 3 and 4. The converging portion 20 also has an outlet which is in communication with the inlet of the diverging portion 21. As can be seen the portion 20 converges in a direction from its inlet towards its outlet, while portion 21 diverges from its inlet toward the outlet which is in communication with the combustion zone 3.

The angle of the diverging portion 21 is determined in relation to the upstream speed and turbulence of the fuel/air mixture issuing from the pre-mixing zone 9. The diverging portion 21 also has means to inject additional air, schematically illustrated at 22, into the intermediate zone 23 in order to enhance the turbulence of the fuel/air mixture flow from the pre-mixing zone 9 when the fuel/air flow expands in the diverging intermediate zone 23. Reference numeral 24 denotes the swirling of the fuel/air mixture at the intake of the combustion zone, while arrow 25 denote the gas recirculations within the combustion zone.

The converging portion 20 of the pre-mixing tube 8 assures pre-mixing of the fuel and air in the pre-mixing chamber 9 with the lowest possible risk of self-ignition and flame flashback. The diverging portion 21 enhances the swirling regeneration in order to stabilize the combustion flame in a sufficiently carbureted combustion zone 26. Thus, the invention provides a pre-mixing injection system which assures flame stability, while at the same time guards against flame flashback into the pre-mixing tube.

Figure 8:
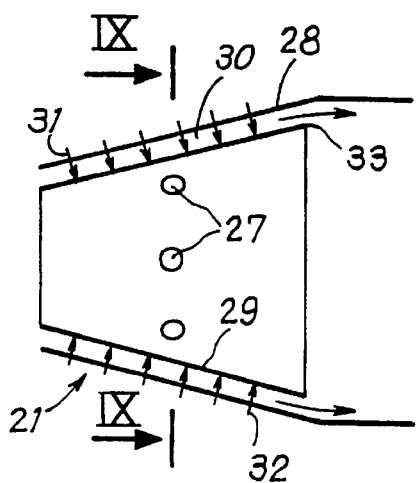
FIG. 8 is a partial, cross-sectional view taken along a longitudinal plane illustrating a first embodiment of the divergent portion of the pre-mixing tube according to the present invention.
Figure 9:
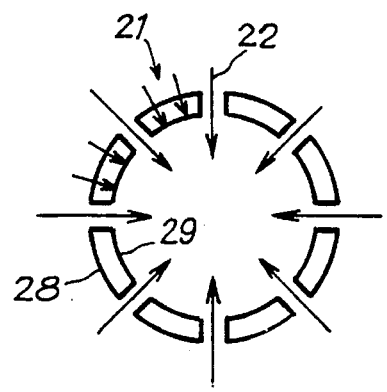
FIG. 9 is a cross-sectional view taken along line IX—IX in FIG. 8.

In a first embodiment illustrated in FIGS. 8 and 9, the means for injecting the complementary air 22 into the intermediate zone 23 comprises orifices 27 formed in the diverging portion 21. The diverging portion 21 comprises an outer wall 28 and an inner wall 29 which are mutually spaced apart so as to form a frusto-conical chamber 30 therebetween. The outer wall 28 has a plurality of holes 31 through which cooling 32 enters the frusto-conical chamber 30 to impact cool the inner wall 29. The cooling air 32 enters the combustion chamber through an evacuation passage 33 located at the downstream end of the diverging portion 21. The orifices 27 extend through both walls 28 and 29 to enable the air to be directed into the intermediate zone 23. The air 22 passing through the orifices 27 is used to establish the downstream fuel/air recirculation and to slow the axial flow speed profile. The orifices 27 either converge toward the longitudinal axis or are slanted so as to assure swirling the injected airflow for the purpose of flame stabilization.

Figure 10:
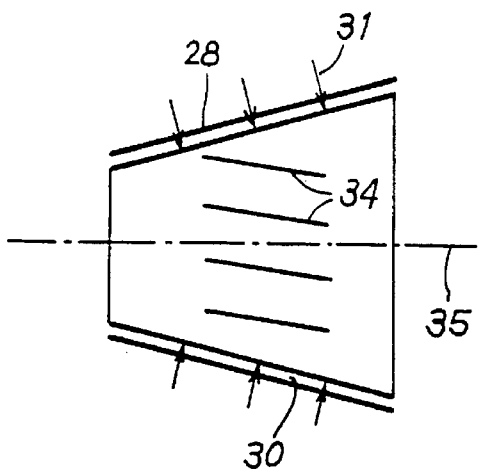
FIG. 10 is a view similar to FIG. 8 illustrating a second embodiment of the divergent portion of the pre-mixing tube according to the present invention.
Figure 11:
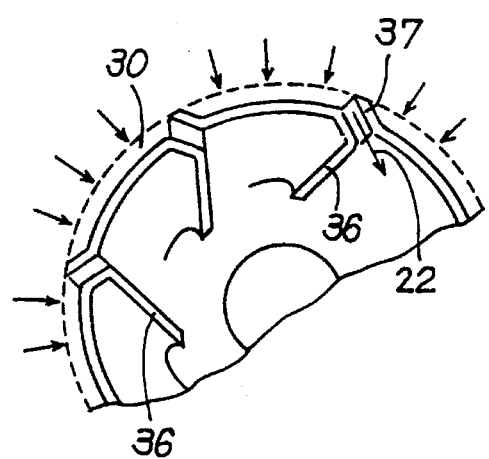
FIG. 11 is a partial, rear view of the diverging portion of the pre-mixing tube illustrated in FIG. 10.
Figure 12:
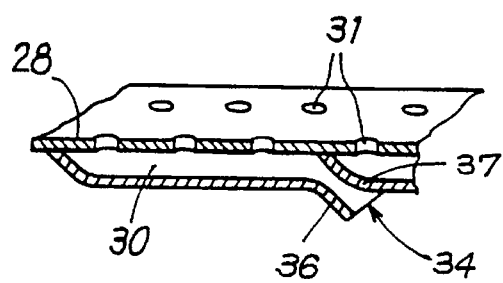
FIG. 12 is a partial, perspective, cross-sectional view through the wall of the diverging portion of the pre-mixing tube illustrated in FIGS. 10 and 11.

In the second embodiment illustrated in FIGS. 10–12, the diverging portion 21 also comprises an outer wall 28 and a spaced apart inner wall 29 so as to define therebetween a frusto-conical chamber 30. The outer wall 28 also comprises openings 31 through which the cooling air 32 enters into the frusto-conical chamber 30. In this embodiment, however, the inner wall 29 has a plurality of substantially parallel slots 34 which are obliquely arranged relative to the longitudinal central axis 35 of the pre-mixing tube 8. The slots establish communication between the frusto-conical chamber 30 and the intermediate zone 23 to allow the entry of the additional air 22 into the intermediate zone 23. The oblique slots 34 are bounded by a lip 36 running obliquely in the intermediate zone 23 and by a connecting wall 37 which extends from the inner wall 29 to the outer wall 28. The air passing through this array of elongated slots 34 enhances the turbulence in the intermediate zone 23.

Figure 13:
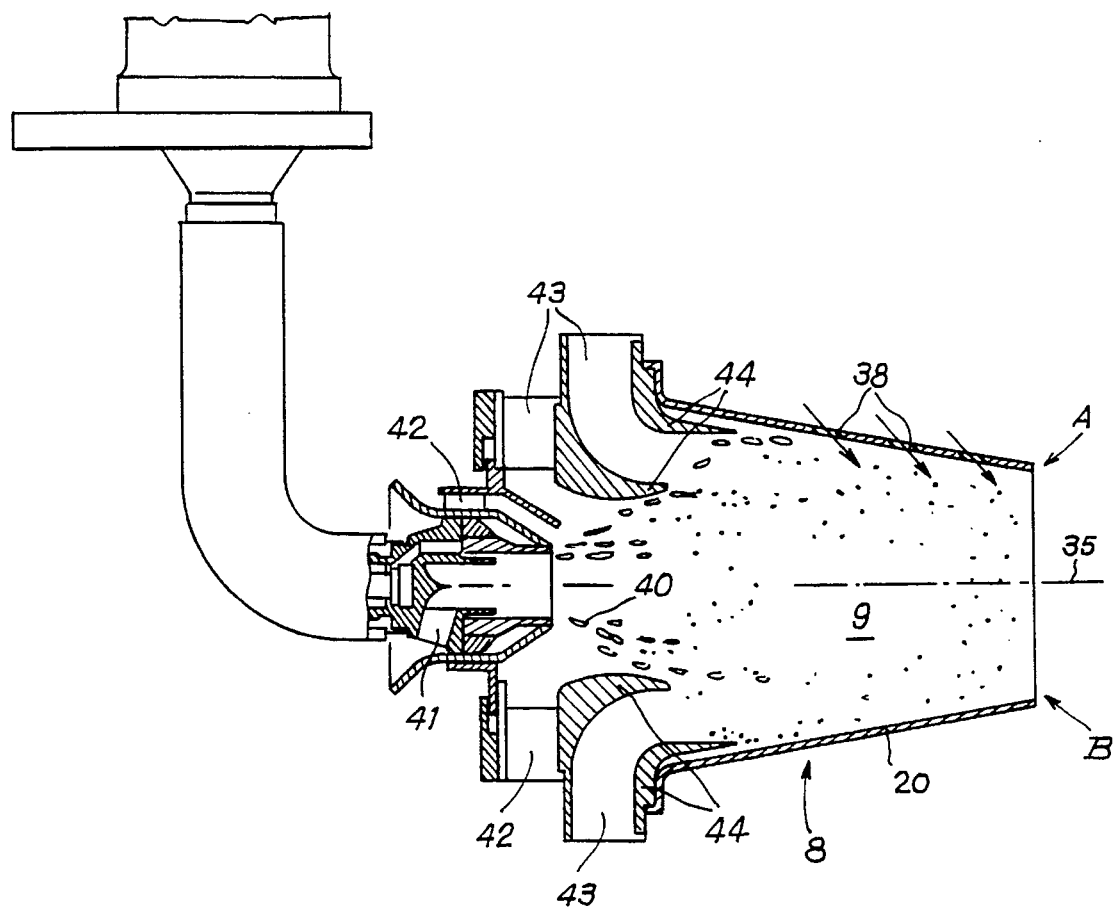
FIG. 13 is a partial, cross-sectional view of the converging portion of the pre-mixing injection system according to the present invention fitted with an aerodynamic fuel injector.

As best seen in FIG. 13, the converging portion 20 of the pre-mixing tube 8 may also have boreholes 38 which communicate with cooling air to establish a cooling film on the inner surface of the converging portion 20 in the pre-mixing zone 9. The fuel injector 6 illustrated in FIG. 13 is an aerodynamic type fuel injector. The fuel is distributed in a homogenous cylindrical sheet 40 around an inner swirler 41. A first swirler 42 may be a radial type (see lower portion B of FIG. 13) or an axial type (see upper portion A of FIG. 13). Primary atomization of the fuel sheet 40 is assured by the inner swirler 41 and the first swirler 42 which sandwich the sheet 40 therebetween. At least one second swirler 43 is present between the first swirler 42 and the upstream end of the converging portion 20 of the pre-mixing tube 8. The second swirlers 43 may be fitted with flanges 44 to ensure secondary mixture atomization. The swirlers 42 and 43 may be swirl inducing in the same direction, or may induce swirls in opposite directions in order to control the atomization cone. The swirlers 43 and the flanges 44 are radially and axially offset in the direction of the fuel/air mixture flow around the head of the fuel injector 6.

FIG. 13 illustrates two versions of the pre-mixing tube. A first version is illustrated in the upper portion A of FIG. 13 and comprises four swirlers; an inner swirler 41; a first swirler 42; and two second swirlers 43. The first swirler 42 is an axial swirler and ensures atomization of the fuel in cooperation with the inner swirler 41. The two second swirlers 43 are radial and, with their flanges 44, assure pre-mixing and secondary atomization. The second version is illustrated in lower portion B of FIG. 13 and comprises three swirlers. The inner swirler 41 is utilized in conjunction with the first swirler 42, which is radial, to ensure atomization of the fuel. A single second swirler 43 having flanges 44 is utilized to assure pre-mixing and secondary atomization.

In order to preserve and maintain the swirling pattern in the pre-mixing tube 8 as far as its downstream exit, the walls of the converging portion 20 are film-cooled by air passing through a plurality of boreholes 38 which slant relative to the generatrix of the pre-mixing tube 8 longitudinally as well as tangentially. This enhances the presence of the recirculation zone at the exit of the pre-mixing tube 8 to also enhance flame stabilization.

FIG. 14 illustrates a dual combustion head combustion chamber 1 wherein the high power or take off head 3 has a pre-mixing injection system according to the invention comprising an aerodynamic fuel injector 6 and a first axial swirler 42. The converging portion of the pre-mixing tube comprises flanges 50 extending toward the central axis 35, as well as axially in the direction of the fuel/air mixture flow (towards the right as illustrated in FIG. 14). Orifices 51 extend through the wall of the converging portion between the flanges 50. The diverging portion comprises a conventional bowl with tangential and sloping bowl orifices 27. The air flow from the bowl orifices 27 is characterized by a velocity component toward the pre-mixing tube axis 35 and a tangential velocity component generating a swirl which rotates in the same direction as that created by the axial swirler 42. This allows improved recirculation of the gases in the injection system.

Figure 15:
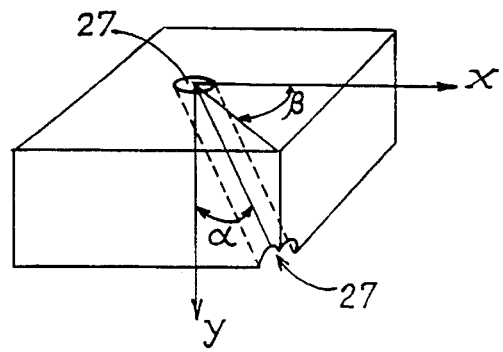
FIG. 15 is an enlarged, schematic illustration of the boreholes which may be formed in the divergent portion of the embodiment illustrated in FIG. 14.

FIG. 15 illustrates a configuration of the bowl orifice 27 relative to a bowl generatrix defined by the x-axis and a y-axis which extend normal to the x-axis. The angle $\alpha$ defines the normal velocity component of the air flow, while the angle $\beta$ defines the tangential component of the air flow.

This technology may also be implemented using aeromechanical injection systems fitted with radial or axial swirlers. The angles $\alpha$ and $\beta$ are defined in relation to the velocity of vectors of the air/fuel mixture near the bowl wall. The angles of the bowl orifices 27 depend upon the location of the orifices so that fresh air can be injected in the same direction as the fuel/mixture circulating near the wall. This enhances cooling efficiency, while restricting the flow of associated air.

The swirlers 42 and 43, whether axial or radial, may be operated with simultaneously or separately driven control diaphragms to regulate the air flow in order to maintain local richness compatible with the performance of the injection systems in the combustion chamber. Typical control diaphragms are described in U.S. Pat. No. 4,726,182.

The foregoing description is provided for illustrative purposes only and should not be construed as in any way limiting this invention, the scope of which is defined solely by the appended claims.

We claim:

1. A pre-mixing injection system to feed a fuel/air mixture to a combustion chamber of a turbojet engine the combustion chamber having a front end, the premixing injection system, comprising:

a) a pre-mixing tube in front of the front end of the combustion chamber comprising:

i) a convergent premixing zone having an inlet and an outlet, the premixing zone converging in a direction from the inlet towards the outlet;

ii) an intermediate zone having an inlet in communication with the outlet of the premixing zone and an outlet in communication with the front end of the combustion chamber, the intermediate zone diverging in a direction from the inlet towards the outlet, the diverging intermediate zone being defined by an inner wall and an outer wall spaced from the inner wall so as to define therebetween a generally frusto-conical chamber, and having a plurality of cooling holes therein to allow cooling air to pass through the outer wall into cooling contact with the inner wall, the frusto-conical chamber having a downstream evacuation passage to allow cooling air to pass from the frusto-conical chamber; and, iii) a plurality of elongated slots in the inner wall to introduce cooling air from the frusto-conical chamber into the intermediate zone wherein the intermediate zone has a central longitudinal axis and wherein the elongated slots are substantially parallel to each other and extend obliquely to the central longitudinal axis;

b) a fuel injector to inject fuel into the inlet of the pre-mixing zone; and c) means to introduce air into the inlet of the pre-mixing zone so as to disperse the fuel into droplets.

2. The pre-mixing injection system of claim 1 wherein the fuel injector comprises an aeromechanical fuel injector.

3. The pre-mixing injection system of claim 2 wherein the means to introduce air into the pre-mixing zone comprises at least one swirler mounted around the aeromechanical fuel injector.

4. The pre-mixing injection system of claim 1 wherein the fuel injector comprises an aerodynamic fuel injector and the means for introducing air into the pre-mixing zone comprises:

a) an inner swirler mounted on the fuel injector;

b) a first air swirler mounted around the aerodynamic injector; and c) at least one second air swirler located between the first air swirler and the convergent pre-mixing zone.

5. The pre-mixing injection system of claim 4 wherein the first air swirler comprises a radial air swirler.

6. The pre-mixing injection system of claim 4 wherein the first air swirler comprises an axial air swirler.

7. The pre-mixing injection system of claim 6 further comprising two second air swirlers of the radial type.

8. The pre-mixing injection system of claim 1 further comprising a plurality of boreholes in the pre-mixing tube communicating with the convergent pre-mixing zone for film cooling the pre-mixing tube.

9. The pre-mixing injection system of claim 8 wherein the pre-mixing tube has a central longitudinal axis and the boreholes extend obliquely in both radial and axial directions.

10. The pre-mixing injection system of claim 1 further comprising a connecting wall extending between the inner wall and the outer wall of the intermediate zone and along one side of each of the elongated slots.

11. The pre-mixing injection system of claim 1 further comprising a lip extending into the intermediate zone from the inner wall along one side of each of the elongated slots.

* * * * *